W. H. KLOCKE.
REINFORCED REAR AXLE HOUSING.
APPLICATION FILED FEB. 2, 1920.

1,363,882.  Patented Dec. 28, 1920.

Inventor
William H. Klocke
By his Attorney
Jas. H. Griffin

UNITED STATES PATENT OFFICE.

WILLIAM H. KLOCKE, OF WOODHAVEN, NEW YORK, ASSIGNOR OF ONE-HALF TO HARRY F. HUGHES, OF BROOKLYN, NEW YORK.

REINFORCED REAR-AXLE HOUSING.

1,363,882.  Specification of Letters Patent.  Patented Dec. 28, 1920.

Application filed February 2, 1920. Serial No. 355,730.

*To all whom it may concern*

Be it known that I, WILLIAM H. KLOCKE, a citizen of the United States, residing at Woodhaven, county of Queens, and State of New York, have invented certain new and useful Reinforced Rear-Axle Housings, of which the following is a specification.

This invention is a reinforced rear axle housing for motor driven vehicles, and has to do, more particularly, with the rigid securing of the axle housing to the differential gear case.

As rear axles are now constructed, the "banjo" type is the one in greatest favor in this country and such axle housing embody a pair of alined axle shaft tubes secured at their adjacent ends on a differential gear case which they support. In practice, the axle shaft tubes are usually formed from sheet metal, while the differential gear case is generally in the form of a casting. The gear case is, in most instances, secured to the axle tubing by means of machine screws which pass through an apertured flange in the casting and thread into tapped holes in the inner ends of the tube. The tubing or stock from which the housing is constructed is made thin to minimize weight and, as only the forward side thereof engages with and is secured to the flange of the gear case, great strain is imposed upon these machine screws.

For a time in the manufacture of automobiles, the thin tapped wall of the tubing was depended upon for an anchorage of the machine screws, but experience showed that so few threads could be formed in said walls that they shortly became stripped or strained and allowed the loosening of the joint between the axle tubing and the gear case. This resulted in leakage of the lubricant normally contained in the gear case, as well as rattling of the parts. The strains imposed thereon by the weight of the differential gear case casting, together with the weight of the car imposed upon the tubings of the axle, particularly when the car was bumping along on uneven roads, require a firm anchorage for said screws and if this is not provided, the screws simply pull out or work loose.

It having been realized that the thin walls of the axle tubing were insufficient to form an anchorage for the machine screws, attempts were made to overcome this difficulty through the increasing of the thickness of the wall by flanging that portion of the tubing juxtaposed with the gear case flange and threading the screws through the double thickness thus produced. While this practice resulted in a stronger and more durable construction, the problem was not solved and the next step consisted in positioning a ring within a flange to give added thickness to the anchorage desired. Holes were tapped through the walls of the tubing and through the ring and the machine screws threaded through the tubing and ring. This is the construction now generally employed. It has the advantage of giving better anchorage than was heretofore possible but is still weak in the fact that the axle housing is supported at the forward side only.

With these considerations in mind, the object of the present invention is not only to provide more adequate anchorage means for the machine screws than heretofore possible, but, at the same time, to mount the differential case on the axle housing by supporting it at the front and rear of said housing.

Features of the invention, other than those specified, will be manifest from the following detailed description read in conjunction with the accompanying drawings and the appended claims.

In the accompanying drawings, I have illustrated one practical embodiment of the invention but the construction herein shown is to be understood as illustrative only and not as defining the limits of the invention.

Figure 1:
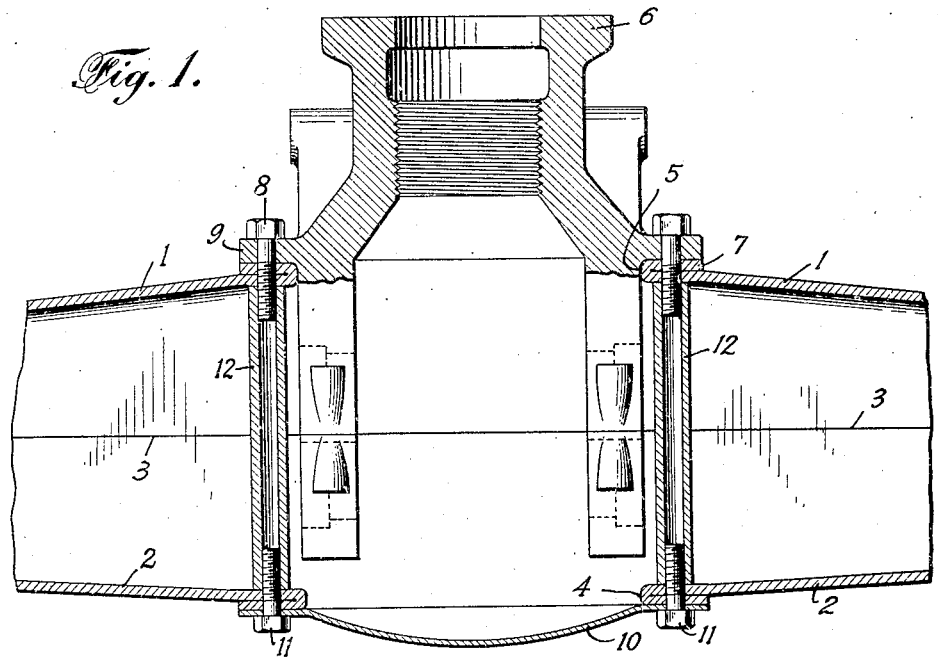
Figure 1 is a central plan section of a reinforced rear axle housing embodying the present invention.
Figure 2:
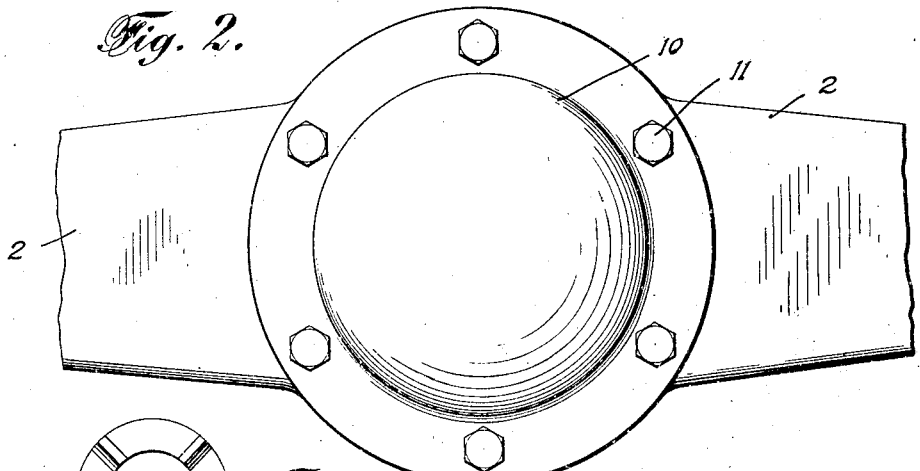
Fig. 2 is a rear elevation of said housing.

The axle housing, shown in the drawings, is a "banjo" housing of a well known conventional form, made in two parts, 1 and 2, which are joined together along the medial line 3 of the housing in any suitable manner, such as by welding or otherwise. The housing is formed of sheet metal and is provided at its back with the usual hand hole 4 and at its front with a similar hole 5, through which a portion of a differential gear case 6 may project into the interior of the housing. The marginal portions of 1 1 the aperture or hole 5 are preferably flanged at 7 and screws 8 pass loosely through a flange 9 on the gear case and through registering holes in the housing. The screws 8 are preferably threaded through neither of these parts, but are dependent for their anchorage upon means positioned within the housing.

The hand hole 4 is adapted to be normally closed by a suitable plate 10 through the marginal portion of which extend machine screws 11, which pass through the wall of the housing adjacent the hand hole, and thread into the same means into which are threaded the screws 8.

The anchorage means of this invention may partake of different forms without departing from the spirit or scope of the invention, but, in its preferred embodiment, consists in a plurality of hollowed tubes or tie-rods 12, both ends of which are interiorly threaded, as shown, to receive the threaded portions of the screws 8, and 11. The tubes portions 12 are in length equal to the interior dimension of the housing and bridge across the housing as shown to form rigid braces and unitary means for securing the hand hole cap or plate in position and the differential gear case to the axle housing. With this construction, the screws 8 and 11 may be made much longer than heretofore and adequate anchorage means is provided for said screws. Moreover, while the gear case is fundamentally supported at the front of the housing, it also finds support at the back thereof through the tie-rods 12, and twisting strains, which would serve to rack the joint between the housing and the gear case and cause opening of the joint between these parts, are rigidly opposed.

Figure 4:
Fig. 4 is an end view of tubing length shown in Fig. 3.
Figure 3:
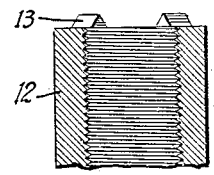
Fig. 3 is a detailed section of one end of a tubing length which I preferably employ.

While the opposite ends of the tie-rods or tubes 12 may be made substantially flat, I preferably provide them with sharp teeth or projections 13, as shown in Figs. 3 and 4, and these teeth tightly grip the interior wall of the housing when the screws 8 and 11 are screwed up tight and serve to produce a very rigid construction.

When the present invention is utilized in rear axle construction, the integrity of the parts and tight joints is at all times assured, and rattling of the parts or leaking of the lubricant through loose joints is overcome. Because of the simplicity of this invention, it is readily adaptable to an ordinary stock axle housing without materially changing its construction. In fact, almost any stock axle of the "banjo" type may be fitted with the present invention by merely increasing the length of the machine screws used and inserting the tie-rods within the axle. It is preferable that the threads in the housing be reamed out before the new screws are put in, but this is not absolutely necessary.

It will be understood that minor and formal changes may be made in the specific construction described, such as the substitution of equivalents, without departing from the spirit or substance of the invention, the scope of which is commensurate with the appended claims.

Having thus fully described the invention, what I claim as new and desire to secure by Letters Patent is:

1. Reinforced axle construction embodying a rear axle housing, a differential gear casing associated therewith, a plurality of tubular tie-rods provided with interiorly threaded ends positioned in parallel relation within the housing and disposed in a fore and aft direction therein, screws passing through the differential gear casing and through the axle housing and threaded into the forward ends of corresponding tie-rods, and screws threaded through the rear wall of the axle housing and into the opposite ends of said tie-rods, whereby the tie-rods serve as an anchorage means for the screws and support the differential gear casing from both the front and back walls of the axle housing.

2. Reinforced axle construction embodying, a rear axle housing, a differential gear casing associated therewith, and means extending in a fore and aft direction across the housing for securing the walls of the housing together in spaced relation, and simultaneously securing the differential gear casing to the housing.

3. Reinforced axle construction embodying a rear axle housing, a differential gear casing associated therewith and tension members extending across the interior of the housing in a fore and aft direction for securing the walls of the housing together in spaced relation, and simultaneously securing the differential gear casing to the housing.

4. Reinforced axle construction embodying a rear axle housing, a differential gear casing associated therewith, anchorage means positioned across the interior of the housing in a fore and aft direction, means for securing the rear portion of the housing to the anchorage means, and means for simultaneously securing the differential gear casing to the forward portion of the housing and the forward portion of the housing to the anchorage means.

5. Reinforced axle construction embodying a rear axle housing provided in its forward side with an aperture through which a portion of a differential gear case may extend, and at its back with a hand hole juxtaposed with the differential gear casing hole, a differential gear casing associated with said axle housing, screws passing through the differential gear casing and through the housing into the interior of the latter, a plate covering the hand hole, screws passing through the margin of the plate and through the housing into the interior of the latter and tubular anchorage means positioned fore and aft of the housing and interiorly threaded at their opposite ends to receive the juxtaposed screws extending into the housing from the front and rear thereof.

6. In a reinforced axle construction, a rear axle housing, a differential gear case casting, and means extending transversely across the chamber of the gear case, for locking the parts of the housing and gear case together.

In testimony whereof, I have signed my name to this specification.

WILLIAM H. KLOCKE.